US006559943B1

(12) United States Patent
Hall et al.

(10) Patent No.: US 6,559,943 B1
(45) Date of Patent: May 6, 2003

(54) FIBER OPTIC SYSTEM INCLUDING DIGITAL CONTROLLER FOR FIBER OPTIC TUNABLE FILTER AND ASSOCIATED METHODS

(75) Inventors: David W. Hall, Satellite Beach, FL (US); Hitesh R. Mehta, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 54 days.

(21) Appl. No.: 09/736,982

(22) Filed: Dec. 14, 2000

(51) Int. Cl.[7] .............................................. G01B 11/00
(52) U.S. Cl. ...................... 356/394; 356/408; 356/416; 385/27; 385/39
(58) Field of Search ................................ 356/394–395, 356/398, 408, 416, 418, 425; 385/15, 24, 27, 39

(56) References Cited

U.S. PATENT DOCUMENTS

| | | | |
|---|---|---|---|
| 4,307,294 A | | 12/1981 | Campbell ..................... 250/201 |
| 4,565,444 A | * | 1/1986 | Mactaggart ................... 356/73 |
| 5,058,977 A | | 10/1991 | Sorin .......................... 385/30 |
| 5,283,845 A | | 2/1994 | Ip .............................. 385/24 |
| 5,357,097 A | * | 10/1994 | Shiozawa et al. ............. 250/205 |
| 5,410,404 A | | 4/1995 | Kersey et al. ................ 356/345 |
| 5,432,609 A | * | 7/1995 | Sugiyama et al. ............ 356/405 |
| 5,543,953 A | * | 8/1996 | Sivarajan et al. ............ 359/189 |
| 5,608,572 A | * | 3/1997 | Nitta et al. ................... 359/344 |
| 5,706,301 A | | 1/1998 | Lagerstrom .................. 372/32 |
| 5,838,437 A | | 11/1998 | Miller et al. ................ 356/345 |
| 6,085,073 A | | 7/2000 | Palermo et al. ............. 455/205 |

FOREIGN PATENT DOCUMENTS

WO 00/13350 3/2000

OTHER PUBLICATIONS

Micronoptics, Cmoca Article entitled "Fiber Fabry–Perot Tunable Filters Improve Optical Channel Analyzer Performance".
Micron Optics, Inc. data sheet No. 9907–TF entitled "Fiber Fabry–Perot Tunable Filter".

* cited by examiner

Primary Examiner—Akm E. Ullah
Assistant Examiner—Jerry T Rahll
(74) Attorney, Agent, or Firm—Allen, Dyer, Doppelt, Milbrath & Gilchrist, P.A.

(57) ABSTRACT

A fiber optic system includes an optical fiber carrying an optical signal having a wavelength peak, an optical detector coupled to the optical fiber for detecting a current optical level (e.g. a photon power level), and a tunable optical filter coupled to the optical fiber upstream from the optical detector. The system further includes a controller connected to the optical detector and the tunable optical filter, for stepping the tunable optical filter over a sequence of wavelengths while analyzing respective optical levels, and for reversing the stepping direction of the tunable optical filter, based upon the current optical level being less than a prior optical level, to locate the wavelength peak of the at least one optical signal. A sample rate is reduced when the wavelength peak of the optical signal is located, to thereby reduce a power consumption of the controller.

33 Claims, 9 Drawing Sheets

FIBER OPTIC SYSTEM INCLUDING DIGITAL CONTROLLER FOR FIBER OPTIC TUNABLE FILTER AND ASSOCIATED METHODS

FIELD OF THE INVENTION

The present invention relates to optical communications, and more particularly, to optical communications using a tunable fiber optic filter.

BACKGROUND OF THE INVENTION

Transmission of information by light over optical fibers is widely used in telecommunication systems. Optical signals are generated, transported along optical fibers and detected to regenerate the original electronic signal with as little change as possible. Optical fibers are combined with electronic signal processing to obtain a lower cost and higher quality digital transmission.

Fiber optic system applications may use direct optical processing of signals without conversion to electronic signals. This typically requires optical signal processors such as amplifiers, multiplex/demultiplexes, splitters, couplers, filters, equalizers, and switches adapted for use with optical fibers. Optical fiber filters are important components for such fiber optic systems. Many different types of optical filters for selecting light of a particular wavelength have been proposed in conjunction with wavelength division multiplexed optical systems for use in optical communication systems.

A fiber Fabry-Perot (FFP) interferometric filter is such a filter. The Fabry-Perot FP Interferometer is described by C. Fabry and A. Perot in 1897 (Ann. Chem. Phys., 12:459–501) and is widely used in a variety of applications of optical filters. The basic structure and operation of the FP interferometer is well-known in the art and is described in many physics and optics texts. This interferometer includes an optical cavity formed between two typically highly reflecting, low-loss, partially transmitting mirrors. Lenses are typically used to collimate divergent optical beams for processing through the FP interferometer.

Fabry-Perot filters include fixed-wavelength FFPs and tunable-wavelength FFPs. Changing the distance between optic fiber ends in the cavity or stretching an optical fiber in the cavity tunes the wavelength. Tuning can be accomplished by controlled temperature variation of the FFP (temperature-tuned) or by changing the relative position of the ferrule elements, without destroying alignment, for example, by electromechanical actuators such as piezoelectric transducers. The response of such filters typically changes with changes in environmental conditions such as temperature, pressure or aging of the filter. Variable voltage and thermal fluctuations (drifts), as well as the non-linearity of the electromechanical actuators and FFP optics, may require constant calibration of the tunable filter when used as an optical channel analyzer, for example.

Controllers for the filters adjust the filter to minimize the signal loss at the selected laser wavelength, while attenuating those lasers which have different wavelengths. An example is the controller disclosed in U.S. Pat. No. 5,838,437 to Miller et al. Conventional controllers use analog RF techniques which have large power requirements for a battery operated remote controller. Typical controllers, for example, may have limited feature sets and use about 6 Watts. Battery life is short and manual control is required to operate the filter. Thus, there is a need for a digital controller which supports an advanced feature set and operates at much lower power to extend battery life.

SUMMARY OF THE INVENTION

In view of the foregoing background, it is therefore an object of the invention to provide a digital controller, for an optical system, which operates at relatively low power to extend battery life.

This and other objects, features and advantages in accordance with the present invention are provided by a fiber optic system including an optical fiber carrying at least one optical signal having a wavelength peak, an optical detector coupled to the optical fiber for detecting a current optical level (e.g. a photon power level), and a tunable optical filter coupled to the optical fiber upstream from the optical detector. The system preferably further includes a controller connected to the optical detector and the tunable optical filter, for stepping the tunable optical filter over a sequence of wavelengths while analyzing respective optical levels. The controller preferably reverses the stepping direction of the tunable optical filter, based upon the current optical level being less than a prior optical level, to locate the wavelength peak of the optical signal.

The controller may include a sample comparison circuit for comparing the current optical level with the prior optical level. The sample comparison circuit preferably reduces a sample rate when the wavelength peak of the at least one optical signal is located, to thereby reduce a power consumption of the controller. The sample comparison circuit may include a first comparator for comparing the current optical level with a threshold, and a second comparator for comparing the current optical level with the prior optical level. The controller does not reverse the stepping direction of the tunable optical filter if the current optical level is less than the threshold.

The optical detector may generate an analog optical level signal representing the current optical level, and the sample comparison circuit may include an analog-to-digital (A/D) converter for converting the analog optical level signal into a digital optical level signal for use by the first and second comparators. The controller may also include a bus controller for generating a location information signal based upon an output from the sample comparison circuit, and a digital-to-analog (D/A) conversion circuit for converting the location information signal into a control voltage for the tunable optical filter. The D/A conversion circuit may include a range and offset selection circuit for selecting a range and offset for the sequence of wavelengths.

Objects, features and advantages in accordance with the present invention are also provided by a method for controlling a fiber optic tunable filter, including detecting a current optical level of an optical signal in an optical fiber, stepping the tunable optical filter over a sequence of wavelengths while analyzing respective optical levels, and reversing the stepping direction of the tunable optical filter, when the current optical level is less than a prior optical level. This permits locating the wavelength peak of the optical signal. The method may include comparing the current optical level with the prior optical level, and comparing the current optical level with a threshold. Again, the stepping direction of the tunable optical filter would not be reversed if the current optical level is less than the threshold.

The current optical level may be represented by an analog optical level signal, and the method may include converting the analog optical level signal into a digital optical level signal for the comparing. Also, the method may include generating a digital location information signal based upon the comparison of the current optical level with the prior optical level, and converting the digital location information signal into a control voltage for the tunable optical filter. Furthermore, a sample rate is preferably reduced when the wavelength peak of the optical signal is located, to thereby reduce power consumption.

The system, controller and method preferbaly involve the conversion of an analog input signal into a digital signal for processing, and the generation of an analog control voltage to the tunable filter. The digital processing, including a reduced sample rate, may reduce power consumption by about 150/1 over conventional analog systems.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
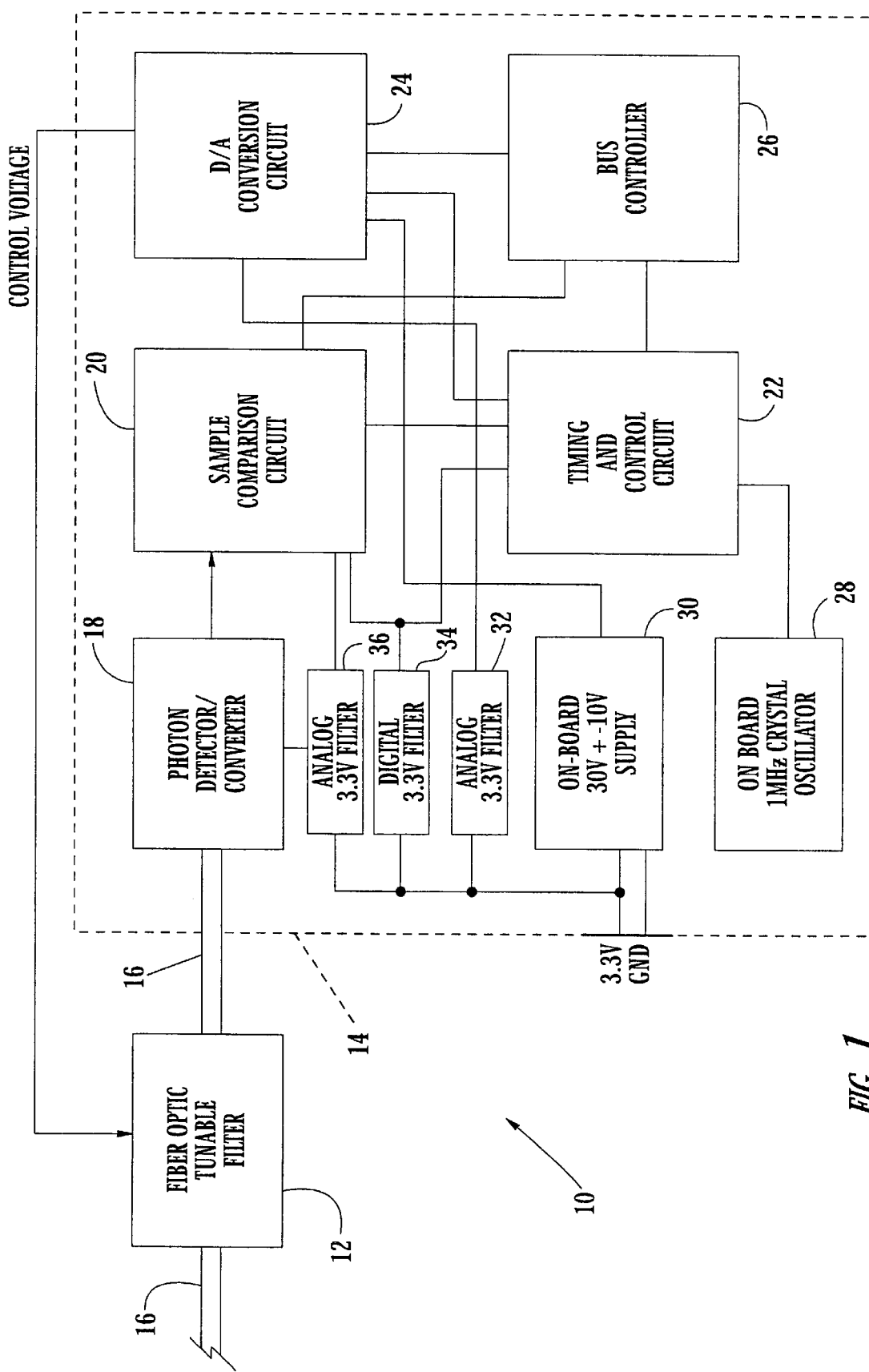
FIG. 1 is a schematic diagram of a fiber optic system including a tunable filter and controller in accordance with the present invention.

Referring to FIG. 1, a fiber optic system 10 will now be described. The system 10 includes an optical fiber 16, e.g. one fiber of a fiber optic bundle, carrying at least one optical signal having a wavelength peak. An optical detector 18 is coupled to the optical fiber 16 for detecting a current optical level (e.g. a photon power level), and a tunable optical filter 12 is coupled to the optical fiber upstream from the optical detector.

The tunable optical filter 12 may be a fiber Fabry-Perot (FFP) interferometric filter which is widely used in a variety of applications of optical filters. The basic structure and operation of the FFP interferometer is well-known in the art and includes an optical cavity formed between two typically highly reflecting, low-loss, partially transmitting mirrors. Lenses are typically used to collimate divergent optical beams for processing through the FFP interferometer. Changing the distance between optic fiber ends in the cavity or stretching an optical fiber in the cavity tunes the wavelength. Tuning can be accomplished by changing the relative position of the ferrule elements, for example, by electromechanical actuators such as piezoelectric transducers.

The response of such filters 12 typically changes with changes in environmental conditions such as temperature, pressure or aging of the filter. Variable voltage and thermal fluctuations (drifts), as well as the non-linearity of the electromechanical actuators and FFP optics, typically require the constant calibration of the tunable filter 12.

The system 10 further includes a controller 14 illustratively connected to the optical detector 18. The controller 14 adjusts the filter 12 to minimize the signal loss at the selected laser wavelength, while attenuating those lasers which have different wavelengths. The controller 14 is connected to the tunable optical filter 12 for stepping the tunable optical filter over a sequence of wavelengths while analyzing respective optical levels. The controller 14 and filter 12 may operate, for example, over a range of about 0–30 Volts and about 4000 to 17,000 quantizing levels. The controller 14 can locate a desired wavelength peak of the optical signal by comparing the current optical level with a previous optical level. If the current optical level is less than the prior optical level, the controller will reverse the stepping direction of the tunable optical filter 12 until the peak is located.

Figure 2:
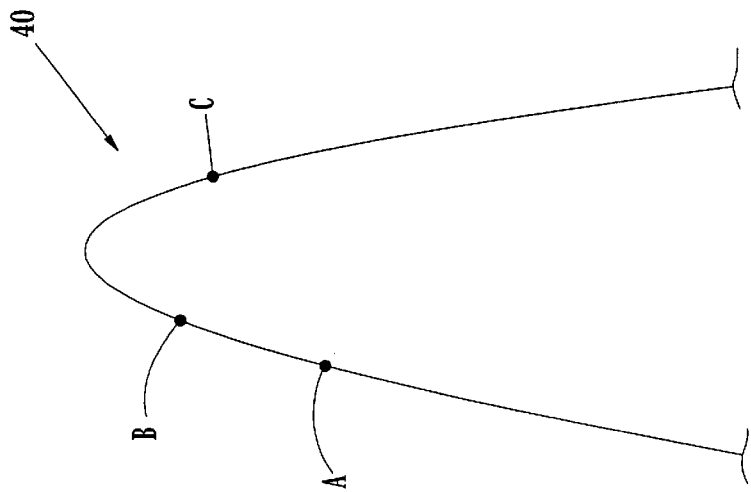
FIG. 2 is a schematic diagram of a wavelength peak of an optical signal illustrating the stepping sequence of the tunable filter in FIG. 1.

For example, referring to FIG. 2, the controller 14 may attempt to locate a wavelength peak 40 of the desired optical signal being transmitted via the optical fiber 16. The tunable optical filter 12 is controlled with a control voltage (e.g. from 0–30 volts) from the controller 14, and the optical detector 18 detects a power level at point A located on the side of the peak 40. The subsequent power level at point B is detected after the tunable filter 12 has been stepped up by the controller 14. The power level at point B is higher than the power level at point A; therefore, the controller 14 determines that the filter 12 is moving up the side of the peak 40 and does not change the stepping direction.

Once again, the control voltage to the filter 12 is increased and the power level at point C is detected. Here, the power level at point C is less than the previous power level at point B so the controller 14 determines that the filter is now moving down the side of the peak 40. Accordingly, the stepping direction of the filter 12 is reversed and the power level is detected at point B again, which is greater than the detected previous power level detected at point C. In this mode, the controller would continue to dither about the peak 40 until another mode is selected.

Figure 4:
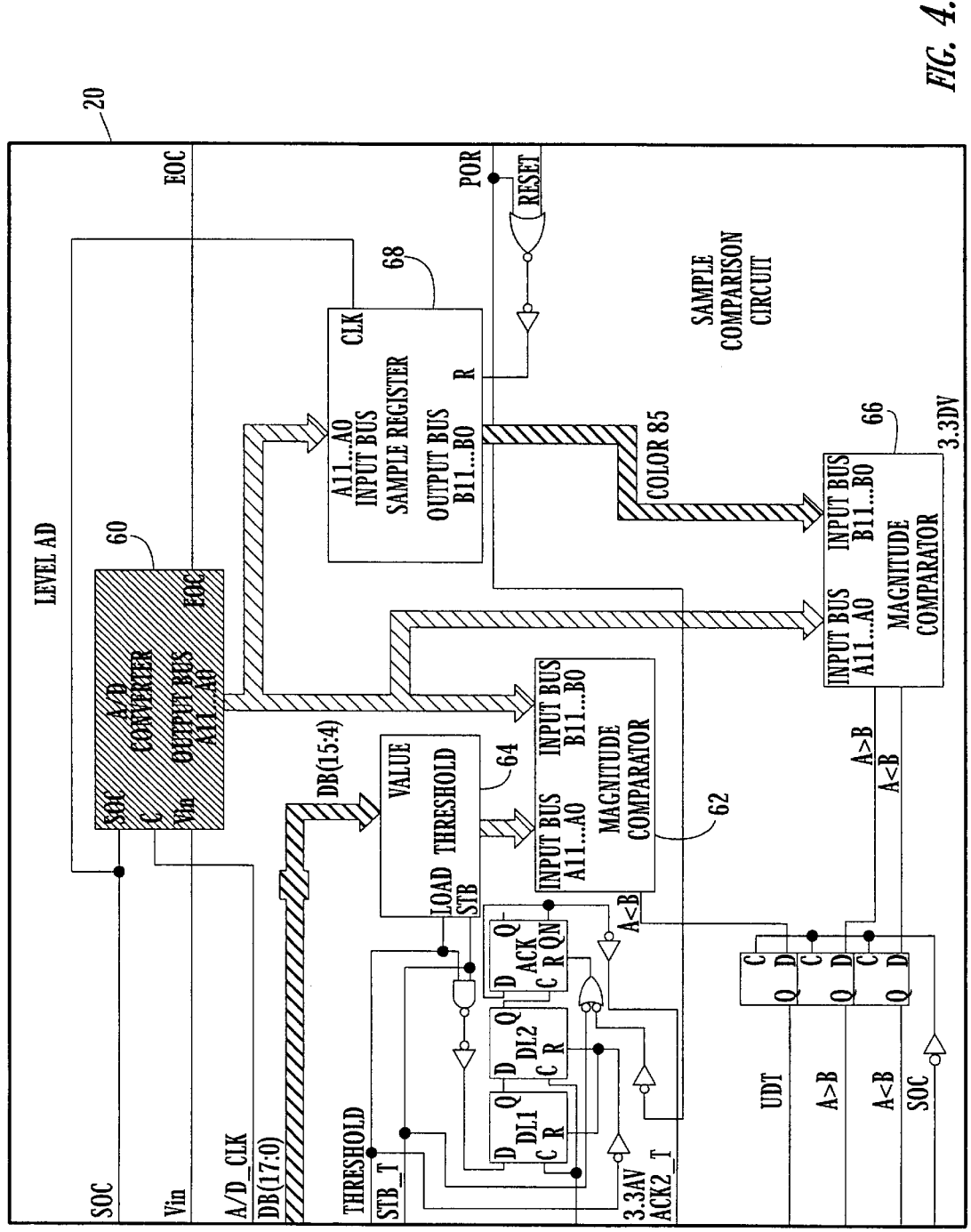
FIG. 4 is a more detailed diagram of an embodiment of the sample comparison circuit of FIG. 1.

The controller 14 may include a sample comparison circuit 20 for comparing the current optical level, e.g. point B in FIG. 2, with the prior optical level, e.g. point A in FIG. 2. The sample comparison circuit 20 preferably reduces a sample rate when the wavelength peak of the at least one optical signal is located, to thereby reduce a power consumption of the controller 14. Referring to FIG. 4, the sample comparison circuit 20 may include a first comparator 62 for comparing the current optical level with a threshold, e.g. from threshold register 64. The sample comparison circuit may also include a second comparator 66 for comparing the current optical level with the prior optical level, as discussed above. As will be discussed in greater detail below, the controller 14 does not reverse the stepping direction of the tunable optical filter 12 if the current optical level is less than the threshold.

The optical detector 18 generates an analog optical level signal representing the current optical level, and the sample comparison circuit 20 preferably includes an analog-to-digital (A/D) converter 60 for converting the analog optical level signal into a digital optical level signal for use by the first comparator 62 and the second comparator 66.

The controller 14 may also include a bus controller 26 for generating a location information signal based upon an output from the sample comparison circuit 20, a digital-to-analog (D/A) conversion circuit 24 for converting the location information signal into a control voltage for the tunable optical filter 12, and a timing and control circuit 22. The D/A conversion circuit 24 may include a range and offset selection circuit 90 for selecting a range and offset for the sequence of wavelengths, and a D/A converter 92 for converting the location information signal into an analog control voltage in view of the selected range and offset for the sequence of wavelengths. The range and offset selection circuit 90 may include a thevenin voltage circuit and a bank of registers for changing the sweep range.

The controller 14 may also include various voltage supply circuits and oscillators such as, for example, an on board 1 MHz crystal oscillator 28, an on board 30V and −10V power supply 30, analog 3.3V filters 32 and 36, and a digital 3.3V filter as would be appreciated by the skilled artisan and as illustrated in FIG. 1.

The method for controlling the fiber optic tunable filter 12 includes detecting a current optical level of an optical signal in the optical fiber 16, stepping the tunable optical filter over a sequence of wavelengths while analyzing respective optical levels, and reversing the stepping direction of the tunable optical filter, when the current optical level is less than a prior optical level, to locate the wavelength peak of the optical signal. The method may include comparing the current optical level with the prior optical level, and comparing the current optical level with a threshold. As discussed above, these comparisons may be performed by comparators 62 and 66 of the sample comparison circuit 20. Again, the stepping direction of the tunable optical filter 12 would not be reversed if the current optical level is less than the threshold.

The method may include converting the analog optical level signal into a digital optical level signal for the comparing. Also, the method may include generating a digital location information signal based upon the comparison of the current optical level with the prior optical level, and converting the digital location information signal into a control voltage for the tunable optical filter 12. Furthermore, a sample rate is preferably reduced when the wavelength peak of the optical signal is located, to thereby reduce power consumption.

The system 10, controller 14 and method involve the conversion of an analog input signal into a digital signal for processing, and the generation of an analog control voltage to the tunable filter 12. The digital processing, including a reduced sample rate, may reduce power consumption by about 150/1 over conventional analog systems as will be described in greater detail below. For example, the present controller 14 may require about 40 milliwatts of power compared to conventional controllers which require about 6 watts of power.

Figure 3:
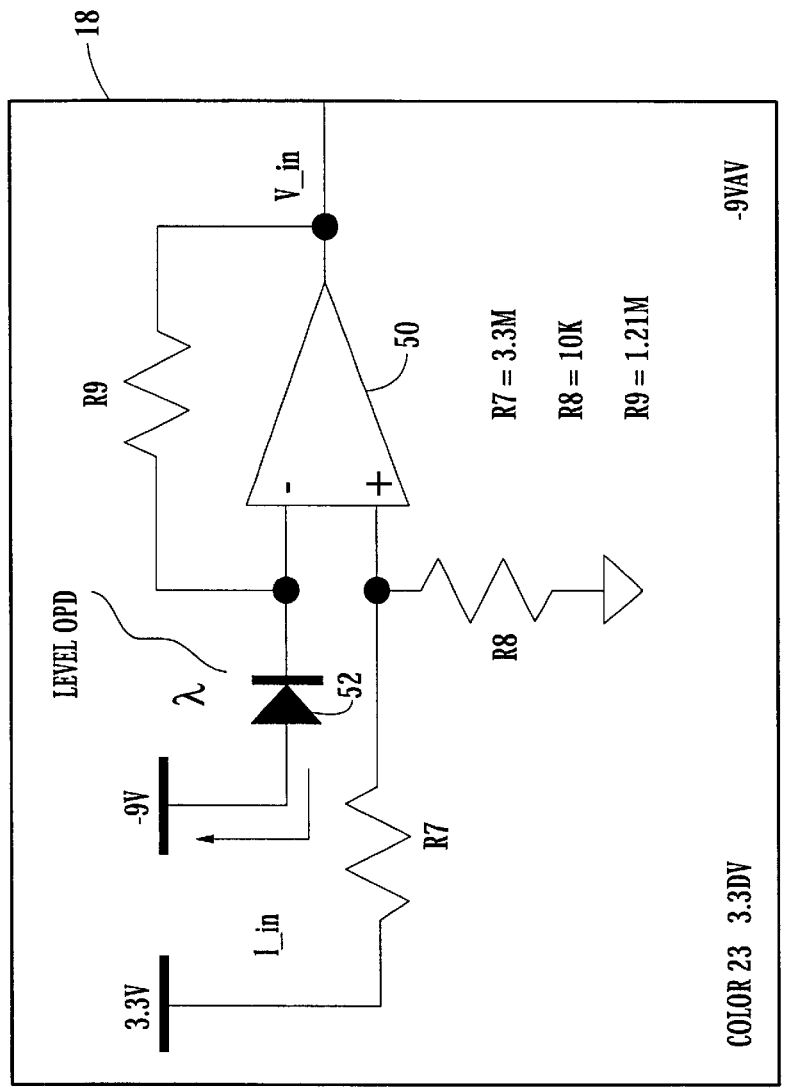
FIG. 3 is a more detailed diagram of an embodiment of the photon detector/converter of FIG. 1.

The digital controller 14 observes the power carried by one fiber 16 of a fiber optic bundle and performs several functions based on the current power and sometimes also on the relative power of the previous reading. Referring to FIG. 3, the single fiber 16 delivers its power into a reverse biased junction of a diode 52. The level of power delivered to the diode 52 is proportional to the reverse current of the diode (0.8 Amperes/Watt). The reverse diode current flows out of the inverting, or [−], input node of an operational amplifier (Op Amp) 50 which has a feedback path from its output to its [−] input so that the sum of the current into the [−] input node is zero.

The non-inverting, or [+], input of this Op Amp 50 is connected to a resistor divider R7/R8 which provides a small positive offset which should be greater than any possible negative offset occurring in the Op Amp so that proper operation is insured. The output of this Op Amp 50 produces a positive voltage that when applied across the feedback impedance, produces a current into the [−] input of the Op Amp that exactly matches the current in the diode 52. The voltage that the output of this Op Amp 50 produces is proportional to the magnitude of the current passing through the light driven diode 52. This provides a conversion sequence of power to current to voltage.

The output of the Op Amp 50 is applied to the input of the A/D converter 60 (FIG. 4). The A/D converter 60 converts the analog voltage into binary data which digital logic is able to process. The binary information provided by the A/D converter 60 is operated on by comparator 66 and latched and then is passed to the timing and control circuit 22 which has the ability to perform several different operations using that binary data. The bus controller 22 has the capability to perform the following functions:

IDLE—Shuts down clocks to most of the system but maintains a constant filter control voltage to the tunable optical filter 12.

LOCATION & POWER—reports the digital representation of the filter control voltage provided to the tunable optical filter 12 and the power at that location.

GOTO—Changes the filter control voltage to a specified scaled binary magnitude.

PEAK HOLD—Maintains the tuning of the tunable optical filter 12 at a peak. Normally used with GOTO, where a location is specified and the filter controller 14 seeks higher power levels, eventually arriving at a peak and then holds the peak in tune even though the peak may drift.

OPTICAL SPECTRUM ANALYSIS (OSA)—Sweeps the filter control voltage from the minimum to the maximum value while placing the power on the COM_BUS for use by an external computer. Also, an indication is provided when a peak is detected (location and power).

DEFAULT—This mode sets user specified items to their default values. This mode is a transient mode followed by an automatic transition to the IDLE mode.

POWER OFF—This mode gently steps the filter control voltage to 0V. This mode is used to reduce the hysteresis prevalent in FFP optical filters. The POWER OFF mode address is 0010 binary.

SET RA—This mode sets the resistor bank RA to a specific value. The SET RA mode address is 0100 binary.

Set RB—This mode sets the resistor bank RB to a specific value. The SET RA mode address is 0101 binary.

SET N—This mode is used to set a divide by N counter driven by the 1 MHz crystal oscillator. It allows the system frequency to be modified for the lowest power consistent with the required response time. The SET N mode address is 1010 binary.

SET THRESHOLD—This mode is used to store a minimum value of the A/D converter 60 output, below which peaks will be ignored. The SET THRESHOLD mode address is 1011 binary.

XFER RA & RB—This mode is used to smoothly transfer the RA and RB codes such that the output range control switches from the current setting to a new setting with a minimum of disturbance. The XFER RA & RB mode address is 1100 binary.

TABLE 1

MODE TABLE

| MODE | ADDRESS | MODE NAME |
|---|---|---|
| 0 | 0000 | IDLE |
| 1 | 0001 | DEFAULT |
| 2 | 0010 | POWER OFF |
| 3 | 0011 | OSA |
| 4 | 0100 | SET RA |
| 5 | 0101 | SET RB |
| 6 | 0110 | GOTO |
| 7 | 0111 | LOCATION & POWER |
| 8 | 1000 | PEAK HOLD |
| 9 | 1001 | UNUSED |
| 10 | 1010 | SET N |
| 11 | 1011 | SET THRESHOLD |
| 12 | 1100 | TRANSFER RA & RB |
| 13 | 1101 | UNUSED |
| 14 | 1110 | UNUSED |
| 15 | 1111 | UNUSED |

The system 10 is intended to operate in only one mode at any instant in time. A confirmation of the mode status is provided by observing the STATUS(3:0). Bits (3:0) of the COM_BUS carry mode identification. Bits (17:4) carry a magnitude if required. After a Power On Reset (POR), the controller 14 is in the Idle mode.

The filter controller accepts mode instruction through bits 3:0 on the COM_BUS(17:0). To interface smoothly with the host computer, a hand shake routine should be followed.

To initiate a command instruction (change to a specified MODE), the REQ_BUS (request bus) input is asserted. When the current operation has completed, the REL_BUS (release bus) output transitions to the 1 state. This indicates to the host computer, that the COM_BUS is now available for input to the filter controller 14. At this time the host computer places the appropriate levels on the COM_BUS and then asserts the STROBE input of the filter controller 14. The filter controller 14 checks to determine if the instruction has been accepted and if so, issues a 1 state on the ACK2 (acknowledge 2) which informs the host computer that the sequence has been either completed or is accepted and is in progress. In addition to the ACK2 confirmation, the internal MODE is encoded and presented on the STATUS(3:0) bus for optional assurance that the requested mode is indeed set. Protocol requires that the host computer de-asserts the REQ_BUS and STROBE inputs to the filter controller 14.

There is a similar handshake protocol for receiving output data from the FIFO of the BUS controller 26. One such operation would be the OPTICAL SPECTRUM ANALYSIS (OSA) mode. The filter controller 14 steps from 0 to 16383 and writes every $4^{th}$ power reading to the FIFO. There are 4095 writes in a complete OSA sweep. The FIFO detects that it has data and raises the RTS (Request To Send) output to the 1 state. The host computer, at its leisure, acknowledges this request by asserting the CTS (Clear To Send) input. The filter then takes the DATA_READY output to the 1 state. The host computer interprets this as a notification that the data on the COM_BUS is valid. The hose computer accepts the data on the COM_BUS and raises the ACK (Acknowkedge) input of the filter controller 14 to the 1 state which signals that the host computer has accepted the data on the COM_BUS and it no longer needs to be maintained as valid data. All hand shake signals, with the possible exception of RTS (RTS stays high if data is still in the FIFO) return to their rest states. During an OSA sweep, up to 32 locations of detected peaks are stored in an internal register. As data is read from the FIFO, these peak locations are written into the FIFO until the register is empty. If more than 32 peaks are detected during an OSA then those peak locations for peak 33 and above are ignored.

Again, referring to FIG. 3, the photon detector/converter 18 receives the single optical fiber 16 output. This block 18 converts photon energy per unit time into a voltage that is proportional to the photon power. The proportionally constant for the conversion of photon power to current is 0.8 Amperes per Watt. The current to voltage conversion constant is 1,210,000 Volts per Ampere (we expect a maximum current of 2.5 micro Amperes which will produce an output from the block of 2.4V).

A small positive offset is applied to the +input of the Op Amp 50. This is introduced to prevent a negative offset from fooling the Op Amp 50 to try to drive its output below ground. The optimum signal swing would be from ground to the positive (3.3V) supply. Approximately 10 mV of this range is lost to gain input offset protection.

The output signal V_in of the photon detector/converter is applied to the input of the 12 bit A/D converter 60 in the sample comparison circuit. The A/D converter 60 has an input range of 0 to 2.4V (2.4V being an internal reference). The 12 bit quantizing level is approximately 5.9 mV (or 0.00061 micro Amperes of photon induced current).

$$\text{Quantizing Level} = \left[\frac{2.4 \text{ V}}{4096}\right] = 5.859 \text{ mV} \qquad (1)$$

The A/D converter 60 has a Start of conversion (Soc) signal, a clock input, an unknown (V_in) input, a 12 bit output bus [A(0:11)] and an End of conversion (Eoc) output. Presently the Eoc information is not used. The A(0:11) digital representation of V_in is provided to a sample register 68 and the two magnitude comparators 62 and 66. The sample register 68 is clocked with the same signal that starts the A/D conversion sequence. The last A(0:11) information is captured before the A/D converter 60 is able to change them. Approximately seventeen primary clock pulses are required for the A/D conversion to complete and update the A(0:11) bus. One magnitude comparator 66 compares A(0:11) to its previous value B(0:11). The second magnitude comparator 62 compares A(0:11) with a threshold value (default value is 511). If the magnitude of A(0:11) is less than the threshold setting, no change to the block output Up Down Toggle (UDT) is allowed. This threshold limitation avoids false peaks in the noise floor to be reported as actual peaks of useful energy. If the threshold value is set to 511 (digital, 111111111 binary) then approximately 12.5% of the range is therefore unavailable for peak recognition. The information in the lower 12.5% of the range is shown on the display but not used for decisions.

The output of the sample register 68 may be provided to the first magnitude comparator 66. The result obtained by the first magnitude comparator 66 reveals whether power is increasing or decreasing. If power is increasing, the optical filter 12 is moving up the side of a peak. In PEAK HOLD mode, this is used to climb up the side of a peak and at the first power decrease measurement it reverses direction and repeatedly dithers about the peak until directed to another mode, the optical power source is shut off or the filter controller 14 is powered down.

The UDT signal, when a logical 1, is used to allow a direction change in the signal to the optical filter control voltage if all the conditions are met. This is discussed in more detail below with respect to the registers and counters and the register clock generator blocks. The A>B signal implies that the current power is greater than the previous power. A<B, conversely, implies that the current power is less than the previous power.

During the LOCATION & POWER mode, the filter controller 14 uses an internal signal (U/D CLK) to determine whether location or power is written into the FIFO. When, in the LOCATION & POWER mode and U/D_CLK is in the logical 1 state, the location is written into the FIFO. If, while in the LOCATION & POWER mode, the U/D_CLK is in the logical 0 state, then the power is written to the FIFO. After a location data and a power data are written into the FIFO the mode jumps to the IDLE mode to conserve battery life. It should be noted that any instruction from the host computer to change to another mode will cause the FIFO to be reset. All information stored in the FIFO is lost upon receiving a mode change request, even if the mode change request is to the current mode.

The bus controller 26 is where instructions are received from an operator and specific signals are sent to other blocks initiating action that will result in the instruction being implemented. Clock rates are determined in the timing and control circuit 22. Clock rates for various modes and operations are defined in table D.

TABLE D

Clock Rates

| MODE | OPERATION | CLOCK RATE |
|---|---|---|
| IDLE | MINIMUM POWER | SOC, COMP_EN & CAPTURE = 0<br>SYS_CLK = 0<br>P_CLK = 1 MHz<br>AD_CLK = 0<br>U/D_CLK = 0 |
| DEFAULT | SETS PARAMETERS TO SAFE VALUES THEN MODE JUMPS TO IDLE | SOC, COMP_EN & CAPTURE = P_CLK/192N<br>SYS_CLK = P_CLK/N<br>P_CLK = 1 MHz<br>AD_CLK = P_CLK/2<br>U/D_CLK = P_CLK/192N |
| POWER_OFF | U/D COUNTER COUNTS DOWN TO 0 THEN MODE JUMPS TO IDLE | SOC, COMP_EN & CAPTURE = P_CLK/192N<br>SYS_CLK = P_CLK/N<br>P_CLK = 1 MHz<br>AD_CLK = P_CLK/2<br>U/D_CLK = P_CLK/192N |
| OSA | PERFORMS A FULL SWEEP OF SELECTED RANGE, LOADS PEAKS THEN JUMPS TO IDLE | SOC, COMP_EN & CAPTURE = P_CLK/192N<br>SYS_CLK = P_CLK/N<br>P_CLK = 1 MHz<br>AD_CLK = P_CLK/2<br>U/D_CLK = P_CLK/192N |
| SET_RA | LOADS THE RESISTANCE SELECTION REGISTER FOR RA THEN JUMPS TO IDLE | SOC, COMP_EN & CAPTURE = P_CLK/192N<br>SYS_CLK = P_CLK/N<br>P_CLK = 1 MHz<br>AD_CLK = P_CLK/2<br>U/D_CLK = P_CLK/192N |
| SET_RB | LOADS THE RESISTANCE SELECTION REGISTER FOR RB THEN JUMPS TO IDLE | SOC, COMP_EN & CAPTURE = P_CLK/192N<br>SYS_CLK = P_CLK/N<br>P_CLK = 1 MHz<br>AD_CLK = P_CLK/2<br>U/D_CLK = P_CLK/192N |
| GOTO | GOES TO A SPECIFIED U/D COUNT THEN JUMPS TO IDLE | SOC, COMP_EN & CAPTURE = P_CLK/192N<br>SYS_CLK = P_CLK/N<br>P_CLK = 1 MHz<br>AD_CLK = P_CLK/2<br>U/D_CLK = P_CLK/192N |
| LOC & PWR | WRITES THE CURRENT LOCATION AND POWER INTO FIFO THEN JUMPS TO IDLE | SOC, COMP_EN & CAPTURE = P_CLK/192N<br>SYS_CLK = P_CLK/N<br>P_CLK = 1 MHz<br>AD_CLK = P_CLK/2<br>U/D_CLK = P_CLK/192N |
| PEAK_HOLD | LOCATES A PEAK NEAR THE CURRENT LOCATION AND LOCKS THE FILTER TO THAT PEAK | SOC, COMP_EN & CAPTURE = P_CLK/1536N<br>SYS_CLK = P_CLK/N<br>P_CLK = 1 MHz<br>AD_CLK = P_CLK/2<br>U/D_CLK = P_CLK/1536N |
| SET_N | SETS THE VALUE OF N INTO THE DIVIDE BY N COUNTER THEN | SOC, COMP_EN & CAPTURE = P_CLK/192N[1]<br>SYS_CLK = P_CLK/N[1]<br>P_CLK = 1 MHz |

TABLE D-continued

Clock Rates

| MODE | OPERATION | CLOCK RATE |
|---|---|---|
| | JUMPS TO IDLE | AD_CLK = P_CLK/2 |
| | | U/D_CLK = P_CLK/192N[1] |
| SET_THRESHOLD | WRITES THE VALUE | SOC, COMP_EN & CAPTURE = |
| | OF THE THRESHOLD | P_CLK/192N |
| | INTO THE | SYS_CLK = P_CLK/N |
| | THRESHOLD | P_CLK = 1 MHz |
| | REGISTER THEN | AD_CLK = P_CLK/2 |
| | JUMPS TO IDLE | U/D_CLK = P_CLK/192N |
| XFER RA & RB | MAKES THE RA & | SOC, COMP_EN & CAPTURE = |
| | RB REGISTERS | P_CLK/192N |
| | ACTIVE CAUSING | SYS_CLK = P_CLK/N |
| | THE THEVENIN | P_CLK = 1 MHz |
| | SUPPLY TO CHANGE | AD_CLK = P_CLK/2 |
| | THEN JUMPS TO | U/D_CLK = P_CLK/192N |
| | IDLE | |

NOTE:
[1]Use previous value of N.

The clock rate for PEAK HOLD is reduced to lower power dissipation. When in the IDLE mode, clock distribution to blocks other than the bus controller and the timing and control circuit is inhibited for maximum power conservation.

Figure 5A:
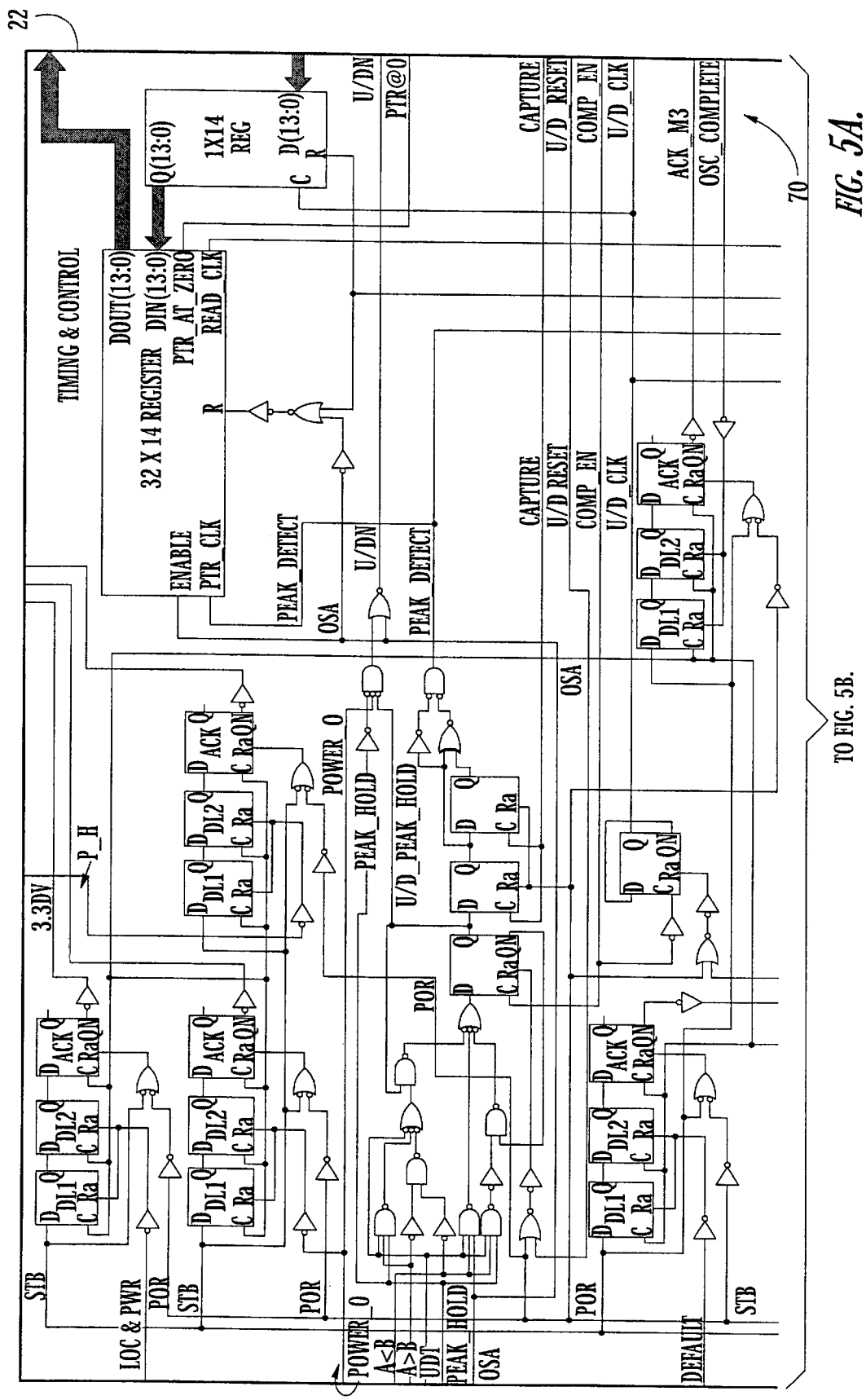
FIG. 5 is a more detailed diagram of an embodiment of the timing and control circuit of FIG. 1.
Figure 5B:
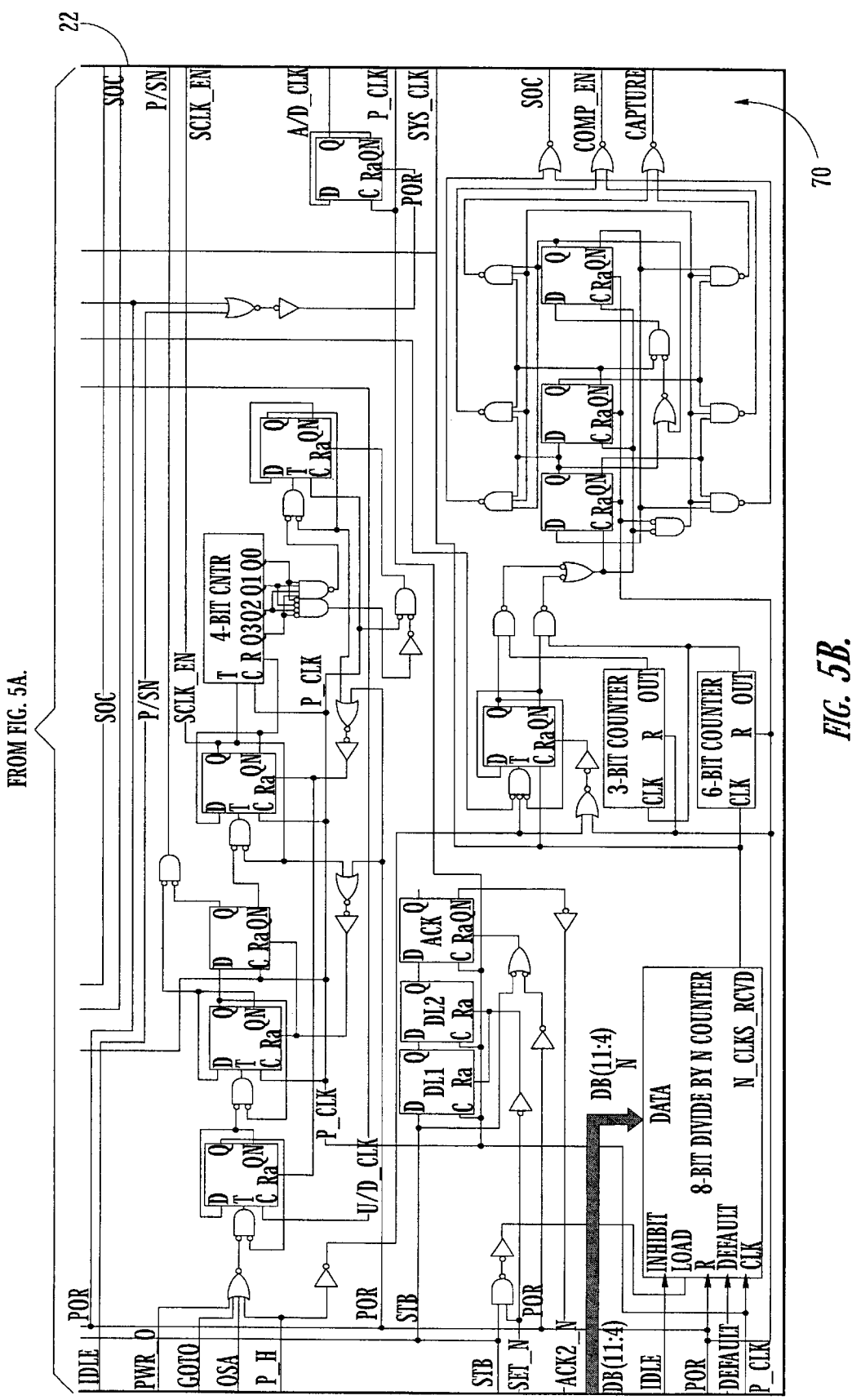
Figure 6A:
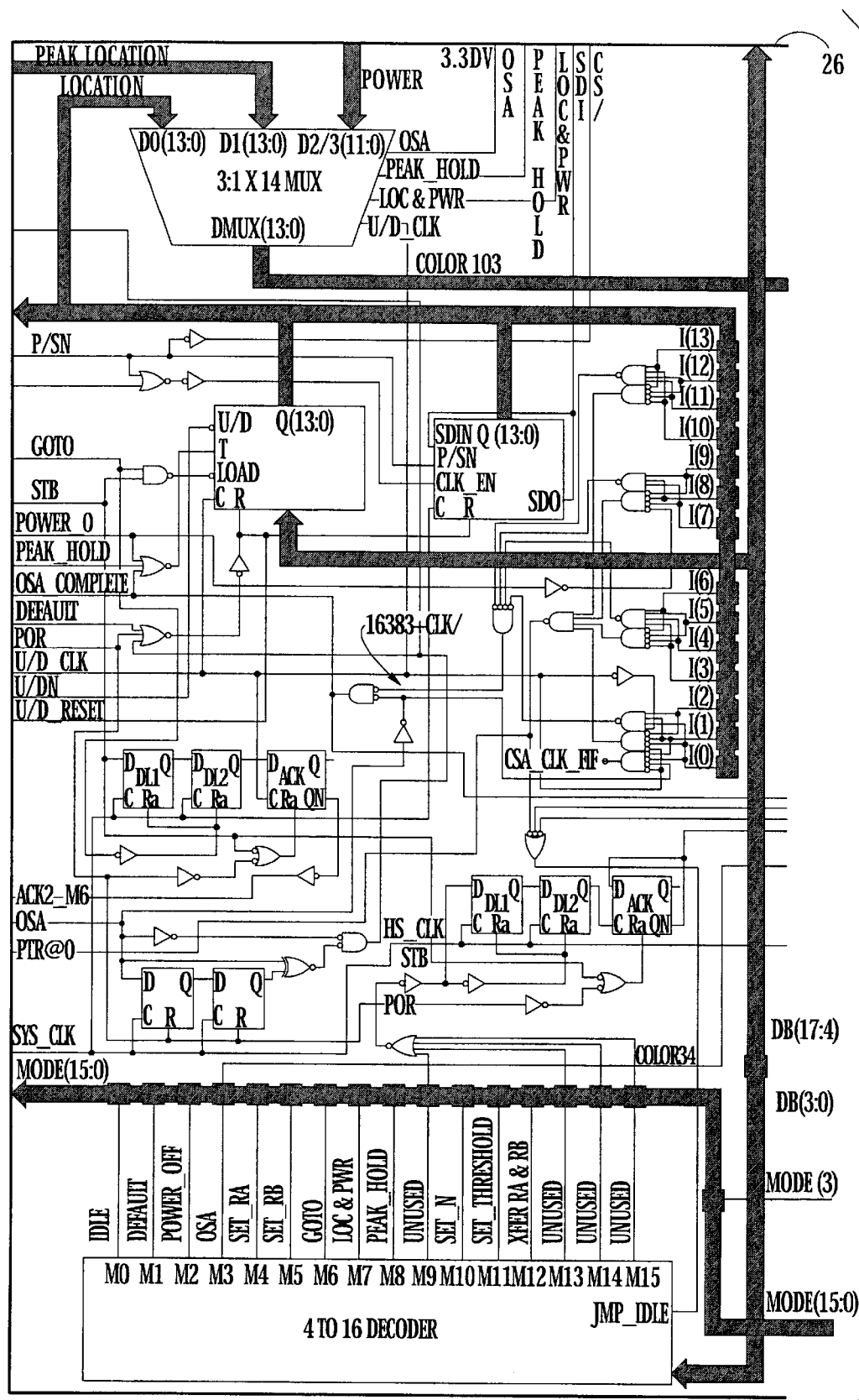
FIG. 6 is a more detailed diagram of an embodiment of the bus controller of FIG. 1.
Figure 6B:
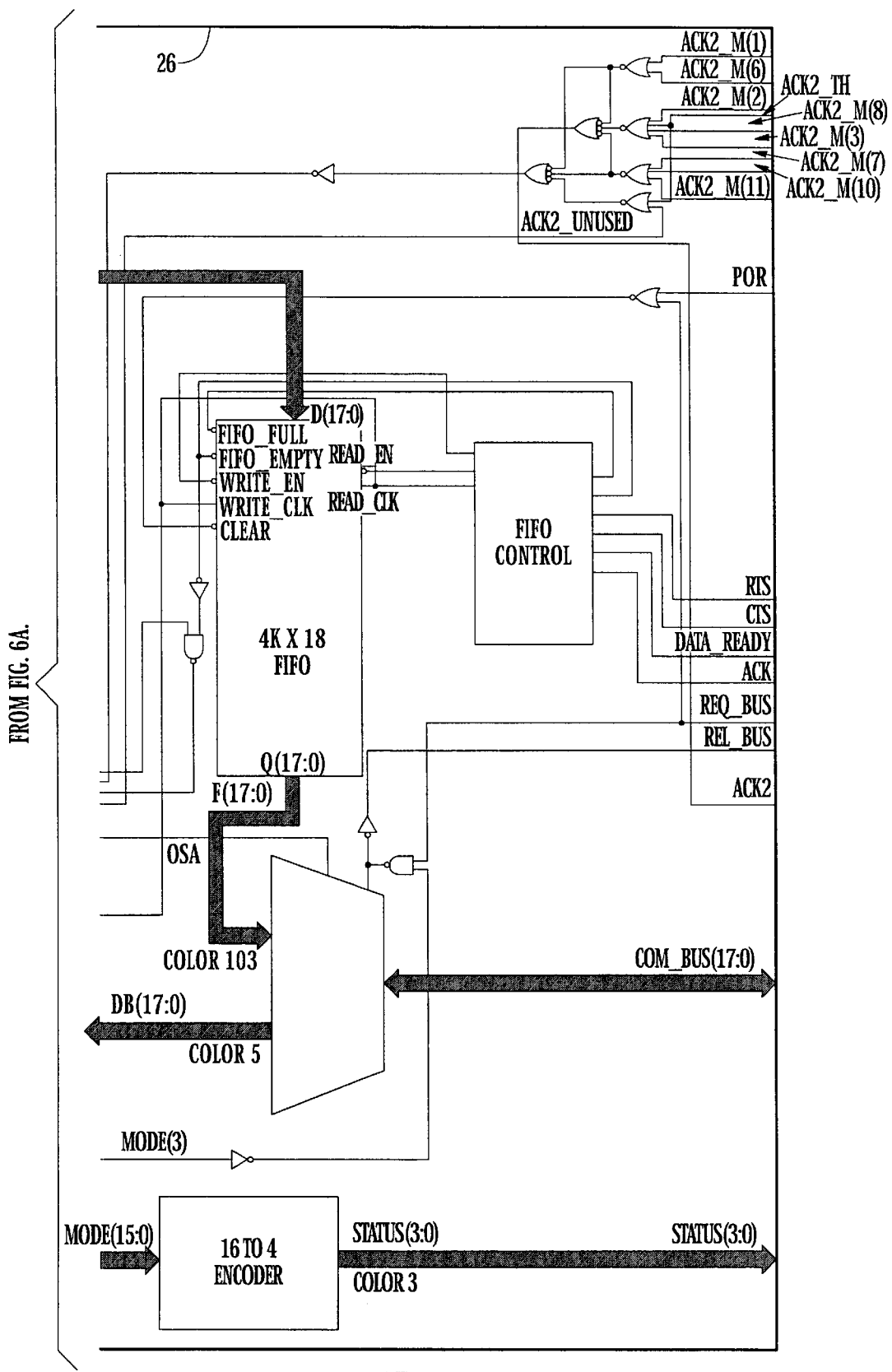

Referring to FIG. 5, the timing and control circuit may utilize a Johnson Counter 70 to produce a set of three non-overlapping clocks. The decoded outputs (the clock phases) are enabled on the opposite clock level to insure non-overlapping properties. A logic trap is included for the case where power is applied and no POR is initiated. The logic trap will quickly organize the data flow in the Johnson counter 70 to be the correct flow. The timing and control circuit 22 also produces clocks for use within the controller 14. The clock signal U/D_Clk rises on the falling edge of Comp_EN and falls on the rising edge of SOC.

Figure 7A:
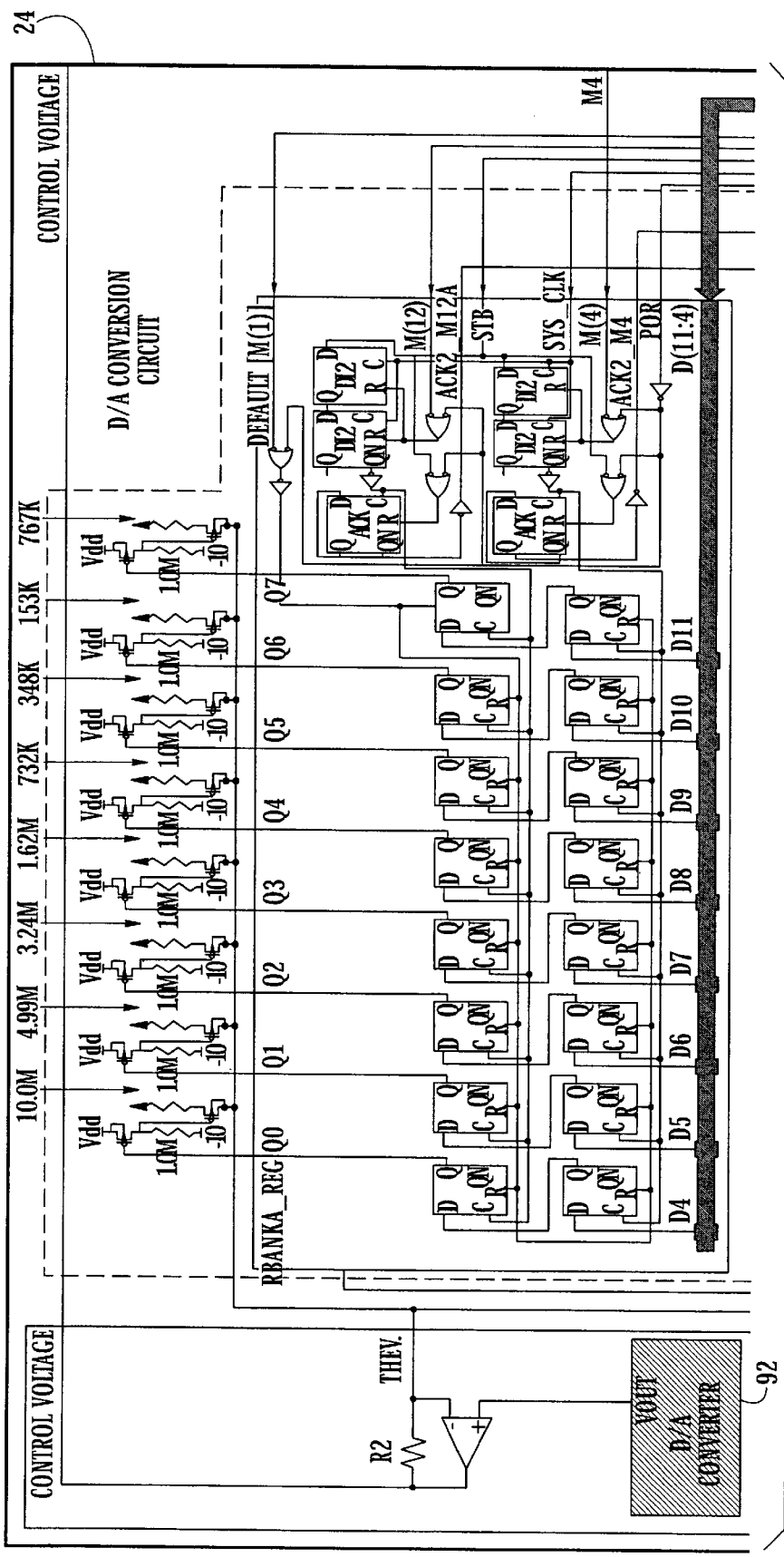
FIG. 7 is a more detailed diagram of an embodiment of the D/A conversion circuit of FIG. 1.
Figure 7B:
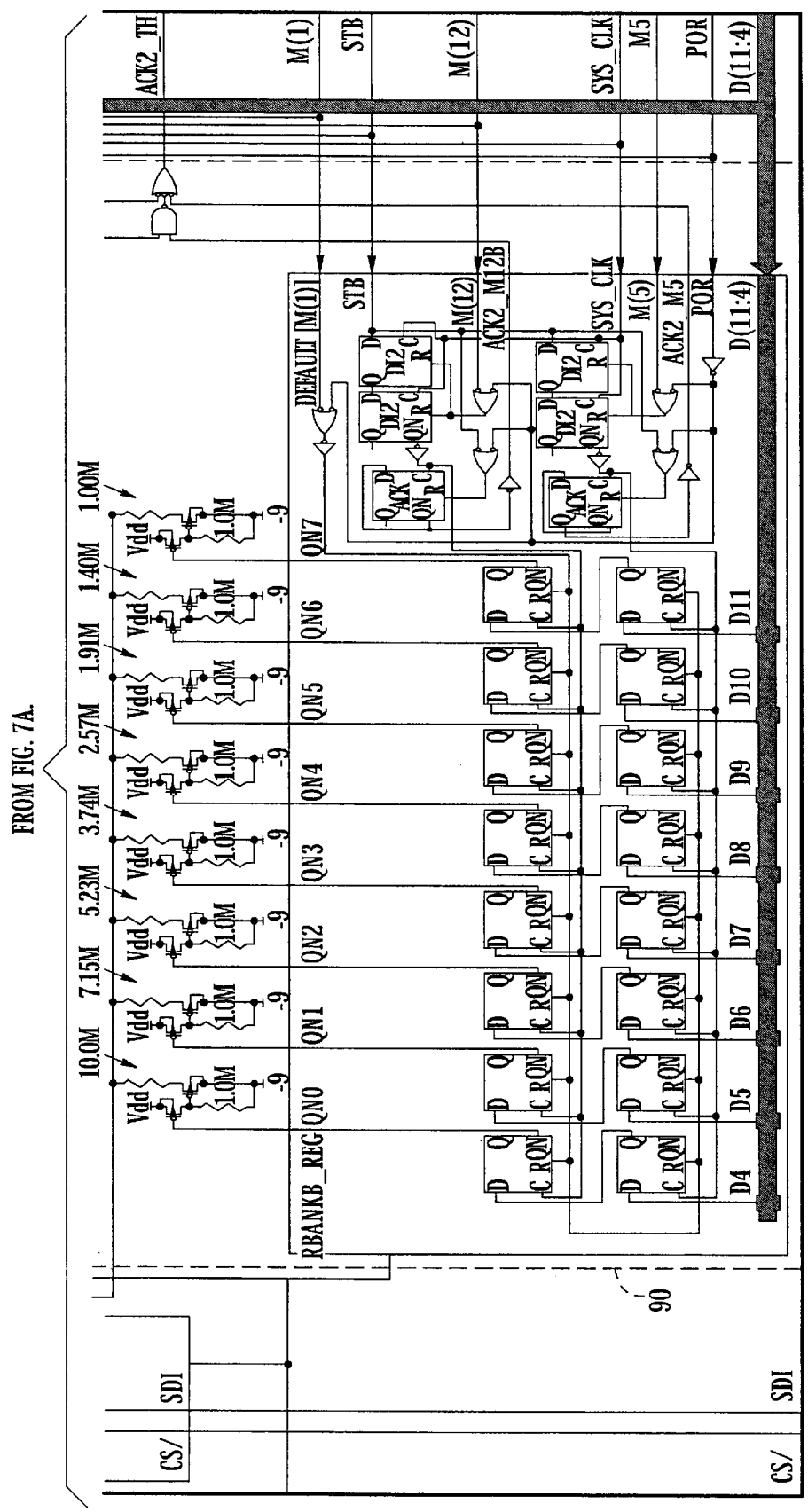

The Bus Controller 26 provides the location information to the D/A converter 92 for conversion to a control voltage that is provided to the control input of the tunable optical filter 12 (FIG. 7). This block 26 also provides location information to be placed on the COM_BUS for extraction by the remote computer.

In the GOTO mode, Data is placed on the COM_BUS and a REQ_BUS is initiated, and on receipt of REL_BUS and the assertion of STROBE, that data is loaded in to the U/D COUNTER. Once loaded into the U/D COUNTER, that data is available for the D/A converter 92 to use in the generation of a control voltage that represents the location requested.

The PEAK HOLD mode is normally preceded by a GOTO cycle to place the tunable optical filter 12 in the neighborhood of a peak. Once in the PEAK HOLD mode, the controller 14 begins to change the location held in the U/D COUNTER such that the power detected is increasing. If the current sample has lower power than the previous sample, then a change in direction is issued through the U/D input of the U/D COUNTER. As the location crosses over the peak, the next sample will indicate a lower power than the last sample. This causes another change in direction to be issued. The location will continually dither about the peak even if the peak drifts.

The Peak-Detect signal indicates that a peak has occurred. It detects the presence of a peak by noticing that after a rising power interval while increasing the location number in the U/D COUNTER, a falling power incident has been detected. This is accomplished by looking for a change from a logical 0 to a logical 1 at the U/D input. The peak indicator for a peak while the U/D counter is decrementing is ignored.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fiber optic system comprising:
an optical fiber carrying at least one optical signal having a wavelength peak;
an optical detector coupled to the optical fiber for detecting a current optical level;
a tunable optical filter coupled to the optical fiber upstream from the optical detector; and
a controller connected to the optical detector and the tunable optical filter, for stepping the tunable optical filter over a sequence of wavelengths while analyzing respective optical levels, and for reversing the stepping direction of the tunable optical filter, based upon the current optical level being less than a prior optical level, to locate the wavelength peak of the at least one optical signal.

2. A fiber optic system according to claim 1 wherein the controller comprises a sample comparison circuit for comparing the current optical level with the prior optical level.

3. A fiber optic system according to claim 2 wherein the sample comparison circuit comprises a first comparator for comparing the current optical level with a threshold, wherein the controller does not reverse the stepping direction of the tunable optical filter if the current optical level is less than the threshold.

4. A fiber optic system according to claim 3 wherein the sample comparison circuit further comprises a second comparator for comparing the current optical level with the prior optical level.

5. A fiber optic system according to claim 4 wherein the optical detector generates an analog optical level signal representing the current optical level.

6. A fiber optic system according to claim 5 wherein the sample comparison circuit further comprises an analog-todigital (A/D) converter for converting the analog optical level signal into a digital optical level signal for use by the first and second comparators.

7. A fiber optic system according to claim 6 wherein the controller further comprises:
   a bus controller for generating a location information signal based upon an output from the sample comparison circuit; and
   a digital-to-analog (D/A) conversion circuit for converting the location information signal into a control voltage for the tunable optical filter.

8. A fiber optic system according to claim 7 wherein the D/A conversion circuit comprises a range and offset selection circuit for selecting a range and offset for the sequence of wavelengths.

9. A fiber optic system according to claim 2 wherein the sample comparison circuit reduces a sample rate when the wavelength peak of the at least one optical signal is located, to thereby reduce a power consumption of the controller.

10. A controller for a fiber optic tunable filter, the controller comprising:
    an optical detector for connection to an optical fiber and for detecting a current optical level of an optical signal having a wavelength peak; and
    a control circuit connected to the optical detector, for stepping the tunable optical filter over a sequence of wavelengths while analyzing respective optical levels, and for reversing the stepping direction of the tunable optical filter, based upon the current optical level being less than a prior optical level, to locate the wavelength peak of the optical signal.

11. A controller according to claim 10 wherein the control circuit comprises a sample comparison circuit for comparing the current optical level with the prior optical level.

12. A controller according to claim 11 wherein the sample comparison circuit comprises a first comparator for comparing the current optical level with a threshold, wherein the control circuit does not reverse the stepping direction of the tunable optical filter if the current optical level is less than the threshold.

13. A controller according to claim 12 wherein the sample comparison circuit further comprises a second comparator for comparing the current optical level with the prior optical level.

14. A controller according to claim 13 wherein the optical detector generates an analog optical level signal representing the current optical level.

15. A controller according to claim 14 wherein the sample comparison circuit further comprises an analog-to-digital (A/D) converter for converting the analog optical level signal into a digital optical level signal for use by the first and second comparators.

16. A controller according to claim 15 wherein the control circuit further comprises:
    a bus controller for generating a location information signal based upon an output from the sample comparison circuit; and
    a digital-to-analog (D/A) conversion circuit for converting the location information signal into a control voltage for the tunable optical filter.

17. A controller according to claim 16 wherein the D/A conversion circuit comprises a range and offset selection circuit for selecting a range and offset for the sequence of wavelengths.

18. A controller according to claim 11 wherein the sample comparison circuit reduces a sample rate when the wavelength peak of the optical signal is located, to thereby reduce a power consumption of the controller.

19. A controller for a fiber optic tunable filter, the controller comprising:
    an optical detector for connection to an optical fiber and for detecting a current optical level of an optical signal having a wavelength peak; and
    a control circuit connected to the optical detector, for stepping the tunable optical filter over a sequence of wavelengths while analyzing respective optical levels, and for reversing the stepping direction of the tunable optical filter, based upon the current optical level being less than a prior optical level, to locate the wavelength peak of the optical signal, the control circuit comprising a sample comparison circuit for comparing the current optical level with the prior optical level, wherein the sample comparison circuit reduces a sample rate when the wavelength peak of the optical signal is located, to thereby reduce a power consumption of the controller.

20. A controller according to claim 19 wherein the sample comparison circuit comprises a first comparator for comparing the current optical level with a threshold, wherein the control circuit does not reverse the stepping direction of the tunable optical filter if the current optical level is less than the threshold.

21. A controller according to claim 20 wherein the sample comparison circuit further comprises a second comparator for comparing the current optical level with the prior optical level.

22. A controller according to claim 19 wherein the optical detector generates an analog optical level signal representing the current optical level.

23. A controller according to claim 22 wherein the sample comparison circuit further comprises an analog-to-digital (A/D) converter for converting the analog optical level signal into a digital optical level signal.

24. A controller according to claim 23 wherein the control circuit further comprises:
    a bus controller for generating a location information signal based upon an output from the sample comparison circuit; and
    a digital-to-analog (D/A) conversion circuit for converting the location information signal into a control voltage for the tunable optical filter.

25. A controller according to claim 24 wherein the D/A conversion circuit comprises a range and offset selection circuit for selecting a range and offset for the sequence of wavelengths.

26. A method for controlling a fiber optic tunable filter, the method comprising:
    detecting a current optical level of an optical signal, having a wavelength peak, in an optical fiber;
    stepping the tunable optical filter over a sequence of wavelengths while analyzing respective optical levels; and
    reversing the stepping direction of the tunable optical filter, when the current optical level is less than a prior optical level, to locate the wavelength peak of the optical signal.

27. A method according to claim 26 further comprising comparing the current optical level with the prior optical level.

28. A method according to claim 27 further comprising comparing the current optical level with a threshold, wherein the stepping direction of the tunable optical filter is not reversed if the current optical level is less than the threshold.

29. A method according to claim 28 wherein the current optical level is represented by an analog optical level signal.

30. A method according to claim 29 further comprising converting the analog optical level signal into a digital optical level signal for the comparing.

31. A method according to claim 30 further comprising:
    generating a digital location information signal based upon the comparison of the current optical level with the prior optical level; and
    converting the digital location information signal into a control voltage for the tunable optical filter.

32. A method according to claim 26 further comprising selecting a range and an offset for the sequence of wavelengths.

33. A method according to claim 26 further comprising reducing a sample rate when the wavelength peak of the optical signal is located, to thereby reduce power consumption.

\* \* \* \* \*